Jan. 12, 1960

T. TINKER 2,920,789

HIGH PRESSURE CLOSURE

Filed Dec. 2, 1955

INVENTOR.
Townsend Tinker
BY
Bean Brooker Buckley & Bean
ATTORNEYS.

INVENTOR.
Townsend Tinker
BY
Bean Brooks Buckley & Bean
ATTORNEYS.

United States Patent Office 2,920,789
Patented Jan. 12, 1960

2,920,789

HIGH PRESSURE CLOSURE

Townsend Tinker, Orchard Park, N.Y., assignor to American Radiator & Standard Sanitary Corporation, New York, N.Y., a corporation of Delaware Application December 2, 1955, Serial No. 550,647

12 Claims. (Cl. 220—46)

This invention relates to closures for pressure vessels and more particularly to covers or closure members for high pressure heads for heat exchangers and similar apparatus.

The problem of sealing vessels against high internal pressures by means of removable closure heads has been the subject of a great deal of design and research activity. Due to the extremely high internal pressures encountered in many pressure vessels of the present day the problems of maintaining an adequate seal and distributing and transmitting the stresses resulting from the high internal pressures present many problems.

It has heretofore been proposed to provide inner and outer closure or cover members with an open fluid pressure connection between the interior of the vessel proper and the space between the inner and outer cover members. In this way the inner cover member is in a state of hydrostatic pressure equilibrium so that the means employed for pressuring a gasket between the inner cover member and the vessel proper does not have to bear the force of the internal pressure in the vessel which acts against the cover means generally in one way or another. Despite the obvious theoretical advantage afforded by this type of design, it has not been adopted to as great an extent as might be in the practical art of very large pressure vessels which carry extremely high internal pressures.

The present invention provides high pressure closure organizations which afford the advantages of the general idea and arrangement of having an inner gasket pressing cover which is not subjected to the main outward pressure force of the fluid within the vessel and which afford other important practical advantages. In the arrangement of the present invention the gasket pressure means, while not subject to the hydrostatic pressure force of the vessel, is accessible from the exterior of the vessel for adjusting gasket pressure and the like.

In its primary form the present invention provides a novel diaphragm and gasket sealing cover arrangement wherein the outward force of the fluid pressure within the vessel is transmitted to the outer cover member in a manner which permits no fluid pressure escape at or about the outer cover member, the only gasketed joint being between inner gasket sealing cover and the pressure vessel proper, the holding means for such sealing and packing means being substantially free of the main fluid pressure force within the vessel. The diaphragm arrangement of the present invention completely isolates the fluid within the vessel and between the inner gasket sealing cover and the diaphragm from the outer cover. The outer cover requires no sealing or gasket arrangement of any kind.

The outer cover retaining arrangement of the present invention is such that the large outward forces received thereby from the aforesaid diaphragm are transmitted to the vessel proper by a threaded connection between the outer cover member and the vessel body. While the gasket pressuring means is accessible and available at the outside of the outer cover member, there is no need for registry as between the outer cover member and the underlying parts and the outer cover member may be threaded into the vessel to the proper depth without regard to its angular position.

Furthermore, the gasket pressuring means requires no tapping of the gasket seating flange and such flange may accordingly be just wide enough to receive a proper gasket, thus providing a vessel head of maximum compactness for a given usable inside diameter and pressure. A further advantage of the general arrangement of the present invention resides in the fact that the gasket pressing force is applied to the gasket sealing cover about a circle which lies within the gasket seating circle.

Thus the resultant moment of gasket tightening force tends to deflect the central portion of the gasket sealing cover inwardly against the pass partition instead of outwardly away from the same as in conventional bolted cover arrangements. Thus a separate pass seal cover is not required to maintain a tight seal across the pass partition. However, a separate pass partition sealing plate may be employed if desired.

In addition to the general advantages outlined above, the several embodiments of the present invention illustrated and described herein provide novel means for assembling and disassembling the closure parts and for handling such parts during assembly and disassembly, all as will appear from a study of the following description of the various embodiments, taken in conjunction with the accompanying drawings.

While various embodiments of the present invention are disclosed herein by way of example and illustration, it is to be understood that various mechanical modifications may be made therein without departing from the principles of the invention, the latter being limited only as defined in the appended claims.

In each of the several embodiments the drawings illustrate what may be considered to be the upper left-hand corners of vertically extending cylindrical pressure vessels. Reference will first be had to the form of the present invention illustrated fragmentarily in Fig. 1.

Figures 1, 3:
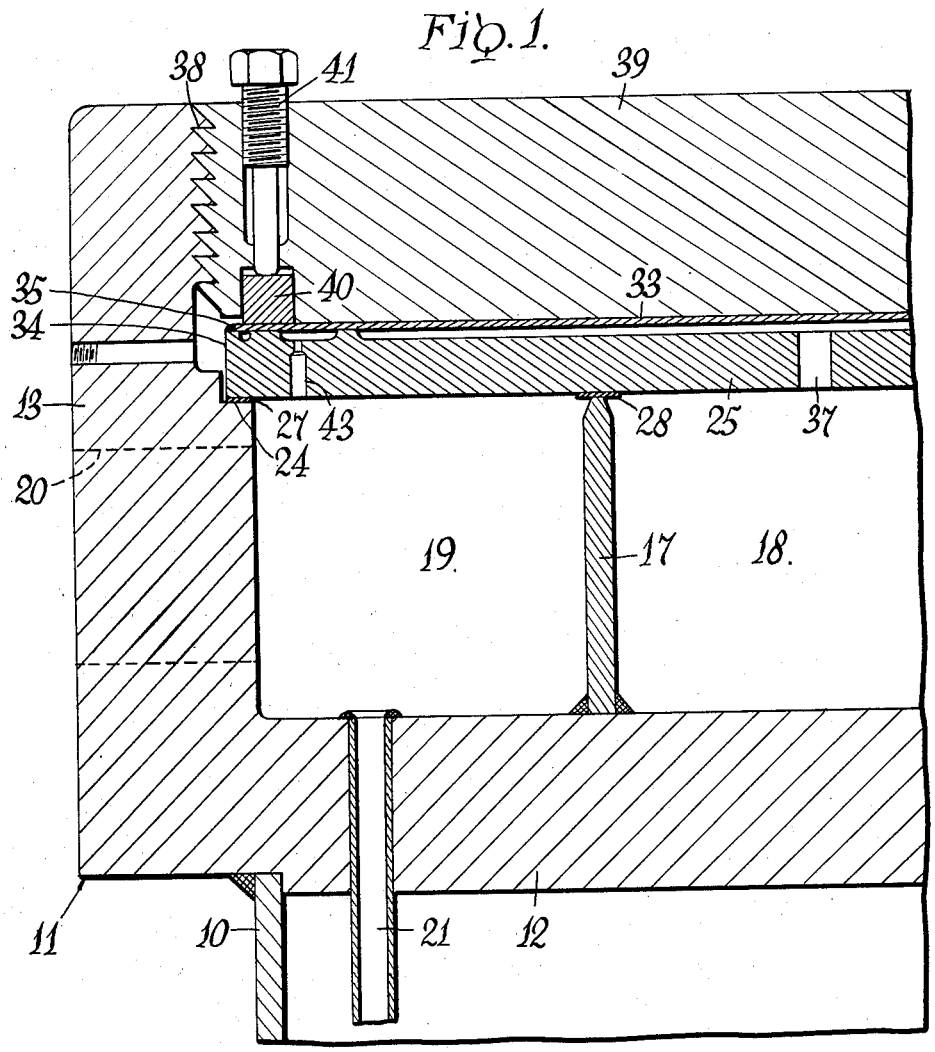
Fig. 1 is a fragmentary cross sectional view taken longitudinally through a corner of a pressure vessel provided with one form of the closure means of the present invention.
Fig. 3 is a fragmentary view of a portion of the closure means of Fig. 2, viewed similarly but showing the operative position of a gasket sealing cover supporting device.

In Fig. 1 the numeral 10 designates a fragmentary upper corner portion of a main hollow cylindrical body member and a head member welded to the upper end thereof is designated generally by the numeral 11. The head member 11 comprises a radial wall portion 12 which in the present instance comprises a tube sheet for a tube type heat exchanger. The head member 11 further includes a cylindrical portion 13 which extends axially outwardly from the pressure vessel proper (upwardly as viewed in Fig. 1). A conventional pass plate or pass rib 17 is welded within the interior of head member 11 and divides the same into an inlet pass portion 18 and an outlet pass portion 19. An outlet passage is indicated at 20 in Fig. 1 and a similar inlet passage is provided at the opposite side of head member 11.

Pressure fluid such as high pressure water or superheated steam enters the inlet pass portion 18 and passes to the outlet pass portion 19 by way of a plurality of tubes which are fixed in tube sheet 12 in conventional manner. Merely by way of example the numeral 21 in Fig. 1 designates one of the heat exchange tubes of the apparatus. All of the foregoing is generally conventional construction in high pressure heat exchanger vessels of this general class and is well known to those skilled in the art to which the present invention relates.

Adjacent to the upper and outer end of the inlet and outlet pass portions 18 and 19, the interior of head member 11 is provided with a ledge formation 24 which provides an annular seat for a backup plate or inner cover member 25. In the present instance backup plate 25 serves as a gasket sealing cover and also comprises a pass rib sealing cover to cooperate with pass rib 17 in dividing or separating inlet pass portion 18 and outward pass portion 19. Inner cover member 25 seats on the ledge 24 through the medium of a sealing gasket 27 and a similar sealing gasket or web portion 28 is interposed between inner cover 25 and the upper edge of pass plate or pass partition 17.

A diaphragm 33 overlies inner cover member 25 and is welded or brazed about its margin to an annular flange 34 formed at the rim of the inner cover member 25 as at 35. One or more openings 37 in inner cover member 25 establish equal hydrostatic pressures above and below the inner cover member at the inlet pass portion side of the head member 11. Thus, the inner cover member and its gasket means provide a fluid seal as between inlet pass portion 18 and outlet pass portion 19 without bearing any portion of the major hydrostatic pressure load within the vessel generally and the pass portions in head member 11. Diaphragm 33 and its marginal weld connection 35 with flange 34 of inner cover member 25 provide a hermetic seal for the head space comprising the inlet and outlet pass portions and the space above the inner cover member 25.

The interior of cylindrical portion 13 of the head member 11 outwardly of flange 24 is provided with internal buttress threads as at 38 in Fig. 1 and a rigid outer cover member 39 is peripherally threaded to engage the internal threads 38. Outer cover member 39 is screwed into such position that its inner radial face substantially abuts the upper surface of diaphragm 33. It will be noted that this threaded connection of outer cover member 39 is outside of and protected from the pressure fluid in the vessel by the hermetic seal formed by diaphragm 33 and its welded or brazed connection 35 and by the gasket seal 27. The manner in which sealing pressure is applied to the latter will now be described.

The under side of outer cover member 39 is formed with an annular recess which receives a compression ring 40. A series of screws 41 thread into outer cover member 39 with their heads accessible at the exterior thereof and bear against compression ring 40 as clearly shown in Fig. 1. The latter in turn bears against inner cover member 25, through the interposed gasket 27, and thus any degree of gasket sealing pressure may be applied by tightening the screws 41. It will be noted that the ring 40, in the form shown in Fig. 1, bears against cover member along an annular area of less diameter than the diameter of the sealing gasket. Thus the deflecting tendency of the central portion of the inner cover member 25 under pressure from compression ring 40 is downward as viewed in Fig. 1 and seals the pass rib gasket 28.

A metering orifice 43 in inner cover member 25 provides for fluid circulation between the inner cover member 25 and diaphragm 33 in a manner and for a purpose which is more fully described in my copending application filed of even date herewith and which detailed description will not be repeated here.

Figure 2:
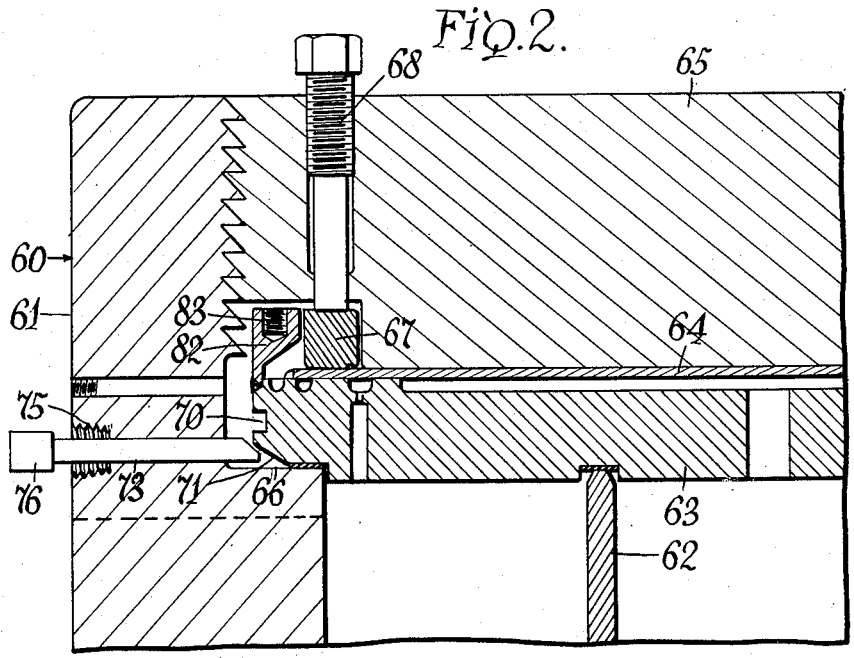
Fig. 2 is a similar view of a modified form of the closure means of the present invention.

The modification of Fig. 2 is generally the same as that of Fig. 1 excepting for additional features and adjuncts relating to handling the inner cover member during assembly and disassembly. The general description of Fig. 2 will be confined to these additional features excepting to identify the parts corresponding to Fig. 1 briefly as follows. The vessel head is generally designated 60, its cylindrical outer portion 61, pass partition 62, inner cover member 63, diaphragm 64, outer cover member 65, gasket seating ledge 66, compression ring 67 and gasket compression screws 68.

The periphery of inner cover member 63 is provided with an annular groove 70 and a beveled lower edge portion 71. A plurality of openings 73 in cylindrical portion 61 of head member 60 are normally plugged as at 75 but may be opened to receive bevel ended spreader members 76 which are driven inwardly against the bevel 71 to break the gasket seal during a disassembling operation.

Referring to Fig. 3, other normally plugged openings 77 are staggered with respect to openings 73 and are threaded to receive screws 80 which may enter annular groove 70 to hold the inner cover member 63 temporarily in an approximate position of assembly. This is particularly useful when the pressure vessel is installed in an inverted position.

Referring further to Fig. 2, a handling ring 82 is attached to the upper marginal edge of inner cover member 63, in the present instance by welding, and is tapped as at 83 to receive temporary screws which are inserted for lifting the inner cover member out of the head 60 or in placing it therein.

Figure 4:
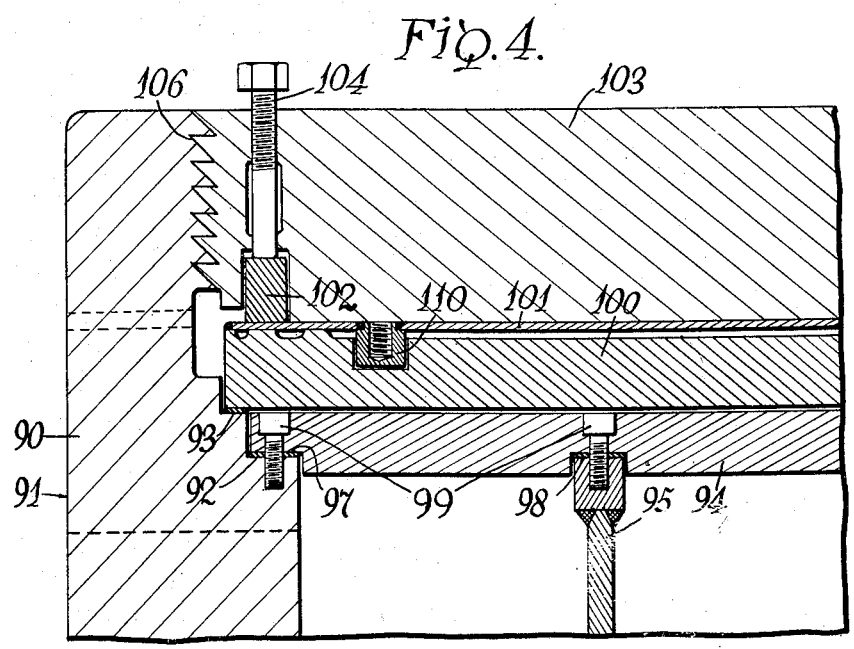
Fig. 4 is a view similar to Figs. 1 and 2 showing a further embodiment of the invention.

In Fig. 4 the cylindrical portion 90 of a head member 91 is provided with stepped annular internal ledges 92 and 93. A separate pass seal cover member 94 seats on ledge 92 and against a pass partition 95, there being intervening gaskets 97 and 98, respectively. Screws 99 retain the pass seal cover member against ledge 92 and pass partition 95.

An inner cover member 100 comprises a gasket sealing and diaphragm backup plate and seats on ledge 93, a gasket or seal for the high pressure fluid being interposed between inner cover member 100 and ledge 93. As in the previously described embodiments, a diaphragm 101 is marginally welded or brazed to the upper edge of inner cover member 100 and a compression ring 102 is mounted in the under side of an outer cover member 103 to bear against the diaphragm and the inner cover member 100. Also as in the previous embodiments, pressure screws 104 which are accessible from outside of the outer cover member bear against compression ring 102 to apply sealing pressure to gasket 97. Outer cover member 103 is in threaded engagement with head member as indicated at 106, likewise as in the previous embodiments.

In Fig. 4 the numeral 110 designates a threaded socket member which has a reduced end portion which is fixed to diaphragm 101 as by welding, brazing, riveting or the like. Diaphragm 101 is provided with a plurality of such socket members, preferably arranged circularly, and threaded studs or screws may be engaged therein, when outer cover 103 is removed, for the purpose of lifting inner cover member 100 along with diaphragm 101 for purposes of assembly and disassembly. Inner cover member 100 is recessed to receive the socket members 110 and the upper ends of the latter are flush with the upper surface of diaphragm 101 so as not to interfere with the uniform pressure transmitting function of the latter.

I claim:
1. Pressure vessel means and a removable closure therefor, said pressure vessel having an outwardly opening end portion and an internal annular ledge spaced inwardly of the outer end thereof, an outer cover member having releasable interfitting connection with said pressure vessel at its open end, an inner cover member seating on said ledge, a diaphragm abutting the inner surface of the outer cover member and peripherally welded to the outer marginal portion of the outer surface of the inner cover member, a compression ring seating against the outer surface of said diaphragm radially inwardly of its peripheral weld portion, and screw means acting on said compression ring to clamp said outer marginal diaphragm portion against said inner cover member to urge the latter into sealing relation with said ledge, said inner cover member having a passage therethrough to establish substantially equal pressures at opposite sides of said inner cover member.

2. Pressure vessel means and a removable closure therefor, said pressure vessel having an outwardly opening end portion and an internal annular ledge spaced inwardly of the outer end thereof, an outer cover member having releasable interfitting connection with said pressure vessel at its open end, an inner cover member seating on said ledge, a diaphragm abutting the inner surface of the outer cover member and peripherally welded to the outer marginal portion of the outer surface of the inner cover member, a compression ring seating against the outer surface of said diaphragm radially inwardly of its peripheral weld portion, and a plurality of screws threaded into said outer cover member with their heads accessible exteriorly thereof and their inner ends bearing against said compression ring to clamp said outer marginal diaphragm portion against said inner cover member to urge the latter into sealing relation with said ledge, said inner cover member having a passage therethrough to establish substantially equal pressures at opposite sides of said inner cover member.

3. Pressure vessel means and a removable closure therefor, said pressure vessel having an outwardly opening end portion and an internal annular ledge spaced inwardly of the outer end thereof, an outer cover member having releasable interfitting connection with said pressure vessel at its open end, an inner cover member seating on said ledge, a diaphragm abutting the inner surface of the outer cover member and having an annular surface portion seating against the outer marginal portion of the outer surface of the inner cover member, a compression ring seating against the outer surface of said diaphragm in registry with said annular seating surface portion, screw means acting on said compression ring to clamp said seating surface portion of the diaphragm against said inner cover member to urge the latter into sealing relation with said ledge, and passage means for establishing substantially equal fluid pressure at opposite sides of said inner cover member.

4. Pressure vessel means and a removable closure therefor, said pressure vessel having an outwardly opening end portion and an internal annular ledge spaced inwardly of the outer end thereof, an outer cover member having releasable interfitting connection with said pressure vessel at its open end, an inner cover member seating on said ledge, a diaphragm abutting the inner surface of the outer cover member and having an annular surface portion seating against the outer marginal portion of the outer surface of the inner cover member, a compression ring seating against the outer surface of said diaphragm in registry with said annular seating surface portion, a plurality of screws threaded into said outer cover member with their heads accessible exteriorly thereof and their inner ends bearing against said compression ring to clamp said seating surface portion of the diaphragm against said inner cover member to urge the latter into sealing relation with said ledge, and passage means for establishing substantially equal fluid pressure at opposite sides of said inner cover member.

5. Pressure vessel means and a removable closure therefor, said pressure vessel having an outwardly opening end portion and an internal annular ledge spaced inwardly of the outer end thereof, an outer cover member having peripheral threaded connection with the interior of said pressure vessel at its open end, an inner cover member seating on said ledge, a diaphragm abutting the inner surface of the outer cover member and having an annular surface portion seating against the outer marginal portion of the outer surface of the inner cover member, a compression ring seating against the outer surface of said diaphragm in registry with said annular seating surface portion, screw means acting on said compression ring to clamp said seating surface portion of the diaphragm against said inner cover member to urge the latter into sealing relation with said ledge, and passage means establishing substantially equal fluid pressures at opposite sides of said inner cover member.

6. Pressure vessel means and a removable closure therefor, said pressure vessel having an outwardly opening end portion and an internal annular ledge spaced inwardly of the outer end thereof, an outer cover member having peripheral threaded connection with the interior of said pressure vessel at its open end, an inner cover member seating on said ledge, a diaphragm abutting the inner surface of the outer cover member and having an annular surface portion seating against the outer marginal portion of the outer surface of the inner cover member, a compression ring seating against the outer surface of said diaphragm in registry with said annular seating surface portion, a plurality of screws threaded into said outer cover member with their heads accessible exteriorly thereof and their inner ends bearing against said compression ring to clamp said seating surface portion of the diaphragm against said inner cover member to urge the latter into sealing relation with said ledge, and passage means establishing substantially equal fluid pressures at opposite sides of said inner cover member.

7. Pressure vessel means and a removable closure therefor, said pressure vessel having an outwardly opening end portion and an internal annular ledge spaced inwardly of the outer end thereof, an outer cover member having peripheral threaded connection with the interior of said pressure vessel at its open end, an inner cover member seating on said ledge, a diaphragm abutting the inner surface of the outer cover member and peripherally welded to the outer marginal portion of the outer surface of the inner cover member, a compression ring seating against the outer surface of said diaphragm radially inwardly of its peripheral weld portion, screw means acting on said compression ring to clamp said outer marginal diaphragm portion against said inner cover member to urge the latter into sealing relation with said ledge, and passage means establishing substantially equal fluid pressures at opposite sides of said inner cover member.

8. Pressure vessel means and a removable closure therefor, said pressure vessel having an outwardly opening end portion and an internal annular ledge spaced inwardly of the outer end thereof, an outer cover member having peripheral threaded connection with the interior of said pressure vessel at its open end, an inner cover member seating on said ledge, a diaphragm abutting the inner surface of the outer cover member and peripherally welded to the outer marginal portion of the outer surface of the inner cover member, a compression ring seating against the outer surface of said diaphragm radially inwardly of its peripheral weld portion, a plurality of screws threaded into said outer cover member with their heads accessible exteriorly thereof and their inner ends bearing against said compression ring to clamp said outer marginal diaphragm portion against said inner cover member to urge the latter into sealing relation with said ledge, and passage means establishing substantially equal fluid pressures at opposite sides of said inner cover member.

9. Pressure vessel means according to claim 1, wherein the inner cover member has a plurality of threaded openings radially outwardly of said diaphragm, and externally threaded lifting devices engageable with said threaded openings for lifting said inner cover member from said pressure vessel open end portion.

10. Pressure vessel means according to claim 1, wherein a plurality of plugs are fixed to said diaphragm and project toward the inner cover member with their outer ends substantially coplanar with the outer surface of said diaphragm, said plugs being internally threaded from said outer ends, and externally threaded lifting devices engageable with the threads of said plugs for jointly lifting said diaphragm and said inner cover member.

11. Pressure vessel means according to claim 1, wherein the pressure vessel end portion has threaded radial apertures outwardly of said ledge and in general registry with said annular peripheral recess, and threaded pins in said radial apertures and adapted to engage in said annular peripheral recess and restrain the inner cover member against substantial axial dislodgement during periods of partial assembly or disassembly.

12. Pressure vessel means according to claim 1, wherein said inner cover member is beveled at its inner peripheral edge and said pressure vessel end portion has a radial aperture outwardly of said ledge and in registry with the beveled edge of said inner cover member, and a bevel ended tool movable through said radial aperture and adapted to engage said beveled edge and lift said inner cover member from sealing engagement with said ledge.

References Cited in the file of this patent

UNITED STATES PATENTS

| | | |
|---|---|---|
| 1,634,655 | Elstone | July 5, 1927 |
| 2,009,877 | Dodd | July 30, 1935 |
| 2,219,659 | Price | Oct. 29, 1940 |
| 2,247,105 | Tinker | June 24, 1941 |
| 2,492,409 | Worn et al. | Dec. 27, 1949 |
| 2,690,276 | Alt | Sept. 28, 1954 |

FOREIGN PATENTS

| | | |
|---|---|---|
| 455,784 | Canada | Apr. 5, 1949 |
| 726,709 | Great Britain | Apr. 2, 1953 |